(12) United States Patent
Nishino et al.

(10) Patent No.: US 7,717,991 B2
(45) Date of Patent: May 18, 2010

(54) INKJET INK, METHOD FOR PRODUCING THE SAME, INK CARTRIDGE, AND INKJET RECORDING METHOD

(75) Inventors: Yuuki Nishino, Tokyo (JP); Daiji Okamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/464,101

(22) Filed: May 12, 2009

(65) Prior Publication Data
US 2009/0285990 A1 Nov. 19, 2009

(30) Foreign Application Priority Data
May 13, 2008 (JP) .............................. 2008-125877

(51) Int. Cl.
C09D 11/02 (2006.01)
B41J 2/01 (2006.01)
(52) U.S. Cl. .................. 106/31.47; 106/31.48; 347/100
(58) Field of Classification Search .............. 106/31.47, 106/31.48; 347/100
See application file for complete search history.

(56) References Cited

U.S. PATENT DOCUMENTS 6,706,102 B2 * 3/2004 Blease et al. ............. 106/31.47

(Continued)

FOREIGN PATENT DOCUMENTS

JP 8-073791 A 3/1996

(Continued)

OTHER PUBLICATIONS

Machine translation of JP 2005/307068, Nov. 2005.*

*Primary Examiner*—Helene Klemanski
(74) *Attorney, Agent, or Firm*—Canon U.S.A., Inc., IP Division

(57) ABSTRACT

An inkjet ink contains at least one coloring material selected from the group of C. I. Direct Violet 107, C. I. Acid Red 14, C. I. Acid Red 52, C. I. Acid Red 87, C. I. Acid Red 289 and C. I. Reactive Red 180, and a coloring material including a compound expressed by general formula (I):

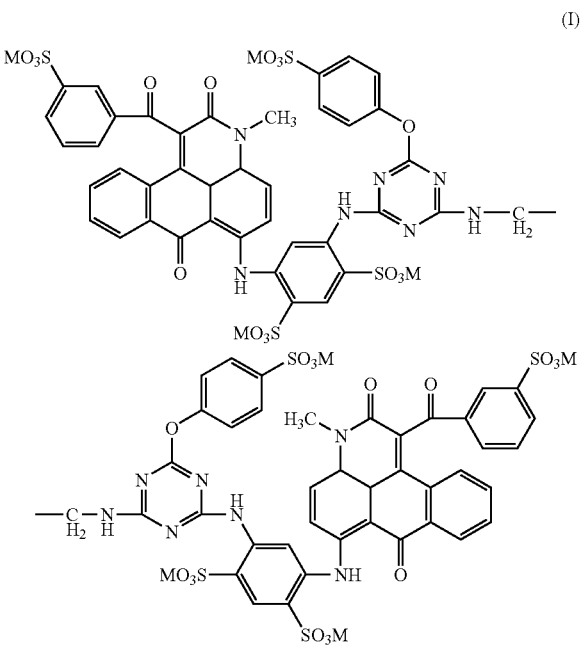

wherein in the formula (I), each M independently represents hydrogen, an alkali metal, ammonium, or an organic ammonium. The ratio of the content in the inkjet ink of the compound expressed by general formula (I) to the total content of coloring materials in the inkjet ink is in the range of 15.0% by mass or more to 40.0% by mass or less.

10 Claims, 2 Drawing Sheets

U.S. PATENT DOCUMENTS

| | | | |
|---|---|---|---|
| 7,195,665 B2 * | 3/2007 | Osumi et al. | 106/31.47 |
| 7,297,196 B2 * | 11/2007 | Matsumoto et al. | 106/31.47 |
| 7,323,045 B2 * | 1/2008 | Hanmura et al. | 106/31.47 |
| 7,416,592 B2 * | 8/2008 | Kitamura et al. | 106/31.47 |
| 7,566,362 B2 * | 7/2009 | Mori et al. | 106/31.48 |
| 7,618,484 B2 * | 11/2009 | Fujimoto et al. | 106/31.47 |
| 2006/0139428 A1 | 6/2006 | Osumi | |
| 2009/0238975 A1 * | 9/2009 | Yamakami et al. | 106/31.48 |
| 2009/0274840 A1 * | 11/2009 | Yamakami et al. | 347/100 |
| 2009/0285988 A1 * | 11/2009 | Matsumoto et al. | 106/31.47 |
| 2009/0286051 A1 * | 11/2009 | Matsumoto et al. | 106/31.47 |

FOREIGN PATENT DOCUMENTS

| | | |
|---|---|---|
| JP | 9-255882 A | 9/1997 |
| JP | 2003-192930 A | 7/2003 |
| JP | 3907671 | 4/2007 |
| WO | 2004/104108 A1 | 12/2004 |
| WO | WO 2006/075706 | 7/2006 |

* cited by examiner

INKJET INK, METHOD FOR PRODUCING THE SAME, INK CARTRIDGE, AND INKJET RECORDING METHOD

BACKGROUND OF THE INVENTION

1. Field of the Invention

The present invention relates to an inkjet ink, a method for producing the inkjet ink, an ink cartridge, and an inkjet recording method.

2. Description of the Related Art

An inkjet recording method is a recording method for forming an image by applying ink droplets onto a recording medium, such as plain paper or a glossy medium. As the price is reduced and the recording speed is increased, this method is rapidly spreading. In addition, as digital cameras are spreading rapidly, and the quality of images formed by the inkjet recording method becomes enhanced, it is increasingly demanded that the inkjet recording method produce recorded matter substantially equal in quality to silver halide photographs.

Also, as the size of ink droplets is reduced and the color gamut is increased by using multiple colors, the image quality can be enhanced more than ever. On the other hand, the demands on coloring materials and inks may also be increased, and demand for properties that provide high color developability and reliability, such as clogging resistance and ejection stability, may become more rigorous.

However, inkjet recording methods can have a disadvantage in that the recorded matter produced by the method can be inferior in terms of its fastness property. In general, recorded matter produced by an inkjet recording method has lower fastness than that of silver halide photographs. More specifically, the coloring material of recorded matter can be degraded by being exposed to light, humidity, heat, or environmental gas in the air for a long time. Consequently, the image is liable to deteriorate in color tone or fade.

In particular, images formed with magenta ink can exhibit the lowest fastness property of the three color inks: cyan, magenta, and yellow. Proposals have been made for dyes used in such magenta inks in order to enhance the lightfastness and the gasfastness of images.

Japanese Patent Laid-Open Nos. 8-73791 and 9-255882 propose a xanthene dye or an azo dye using H acid as a coloring material that can form images having relatively high color developability. Research has been conducted for these types of magenta dye that may be capable of producing superior color developability, and high light-fastness and gas-fastness. Also, anthrapyridone dyes are disclosed as a magenta dye producing relatively high light-fastness and gas-fastness in International Publication Nos. WO2004/104108 and WO2006/075706 and Japanese Patent Laid-Open No. 2003-192930. In particular, Japanese Patent Laid-Open No. 2003-192930 and International Application No. WO2006/075706 disclose a compound having a structure in which two anthrapyridone molecules are coupled with a linking group, and an ink containing such a compound.

Furthermore, Japanese Patent No. 3907671 discloses that an ink containing a xanthene dye or an azo dye and an anthrapyridone dye can form images superior in color developability, light-fastness, and gas-fastness. More specifically, a xanthene dye or azo dye superior in color developability, but inferior in light-fastness and gas-fastness, and an anthrapyridone dye superior in light-fastness and gas-fastness, may make a good complement to each other, and may thus produce images having high color developability and high light-fastness and gas-fastness.

As described above, various studies have been made to enhance the fastness property of images formed with magenta inks. However, no approach has yet achieved a magenta ink that adequately satisfies recent requirements for high-level color developability, light-fastness, and gas-fastness.

SUMMARY OF THE INVENTION

According to an aspect of the invention, an inkjet ink is provided which includes at least one coloring material selected from the group of C. I. Direct Violet 107, C. I. Acid Red 14, C. I. Acid Red 52, C. I. Acid Red 87, C. I. Acid Red 289 and C. I. Reactive Red 180, and a coloring material including a compound expressed by general formula (I):

wherein each M independently represents hydrogen, an alkali metal, ammonium, or an organic ammonium. In the inkjet ink, a ratio of a content of the compound expressed by general formula (I) to a total content of coloring materials is in a range of 15.0% by mass or more to 40.0% by mass or less.

According to another aspect of the invention, a method for producing an inkjet ink is provided. The method includes filling an inkjet ink containing at least one coloring material selected from the group of C. I. Direct Violet 107, C. I. Acid Red 14, C. I. Acid Red 52, C. I. Acid Red 87, C. I. Acid Red 289 and C. I. Reactive Red 180 into an ink holder of an ink cartridge, the ink holder accommodating an inkjet ink containing a coloring material including a compound expressed by general formula (I):

wherein each M independently represents hydrogen, an alkali metal, ammonium, or an organic ammonium. In the method, the inkjet ink is filled into the ink holder of the ink cartridge such that a ratio of the compound expressed by general formula (I) to a total content of coloring materials in the inkjet ink is in a range of 15.0% by mass or more to 40.0% by mass or less.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the present invention.

DESCRIPTION OF THE EMBODIMENTS

The present invention will further be described in detail with reference to exemplary embodiments. When a coloring material of an ink is a salt, the salt may be dissociated into its constituent ions. In the following description, however, such an ink is expressed as an ink containing the salt for convenience in writing.

The present inventors have reviewed the known approaches to forming inkjet inks and reached the following findings. The azo dyes using H acid or a xanthene dye disclosed in Japanese Patent Laid-Open Nos. 8-73791 and 9-255882 are can be superior in color developability, but are generally inferior in light-fastness and gas-fastness. In addition, these dyes are still inferior in light-fastness and gas-fastness to dyes having other hues, such as cyan dyes represented by copper phthalocyanine dyes and yellow dyes. The use of the ink containing an anthrapyridone dye disclosed in International Publication Nos. WO2004/104108 and WO2006/075706 and Japanese Patent Laid-Open No. 2003-192930 can enhance the light-fastness and gas-fastness of images. However, this ink cannot form an image having a color developability equal to inks having other hues. Furthermore, it has been found that the ink containing a xanthene dye or an azo dye and an anthrapyridone dye disclosed in Japanese Patent No. 3907671 may have the following issues. This ink can produce recorded images having light-fastness and gas-fastness that may be enhanced to some extent in comparison with inks containing only an azo dye or a xanthene dye as a coloring material. However, the fastness property still does not still reach a level that is sufficiently high to meet the recent requirements.

As a result of further study by the present inventors, it has been found that images recorded with the known inks may cause a difference in hue between an image allowed to stand for only several minutes and an image allowed to stand indoors for several days. In the description herein, the stability of hue of images with time is referred to as color stability.

Thus, as described above, an inkjet ink has not yet been achieved which can form images having sufficiently high color developability, light-fastness and gas-fastness, and further sufficiently good color stability, at the same time.

Accordingly, the present inventors have devised an improved inkjet ink. Embodiments of the inkjet ink may be capable of forming images with good and even superior color developability, light-fastness, gas-fastness, and color stability, such as those described in the Examples disclosed herein. A method for producing the inkjet ink, as well as an ink cartridge and an inkjet recording method using the inkjet ink, are also provided.

<Inkjet Ink>

Constituents of an inkjet ink (hereinafter simply referred to as ink in some cases) according to an embodiment of the invention will now be described.

(Coloring Material)

The ink according to an embodiment of the invention contains at least one coloring material selected from the group consisting of C. I. Direct Violet 107, C. I. Acid Red 14, C. I. Acid Red 52, C. I. Acid Red 87, C. I. Acid Red 289 and C. I. Reactive Red 180. Each of these coloring materials may be capable of imparting superior color developability to images formed therewith. Accordingly, images recorded by an inkjet method using an ink containing such a coloring material can even have a color developability substantially equal to that of silver halide photographs. In the following description, the group consisting of C. I. Direct Violet 107, C. I. Acid Red 14, C. I. Acid Red 52, C. I. Acid Red 87, C. I. Acid Red 289 and C. I. Reactive Red 180 may, in some cases, be referred to as the coloring material group.

The ink according to aspects of the present invention further contains a compound expressed by the following general formula (I) as another coloring material in addition to the coloring material selected from the coloring material group. The compound expressed by general formula (I) may be capable of imparting highly superior light-fastness and gas-fastness to images, and may also be capable of remarkably enhancing the light-fastness and gas-fastness of images formed with an ink containing the at least one coloring material selected from the coloring material group described above, even if the content thereof is relatively low. In addition, the ratio of the compound expressed by general formula (I) to the total content of coloring materials in the ink may be in the range of 15.0% by mass or more to 40.0% by mass or less. The content of the compound expressed by general formula (I) and the total content of the coloring materials are values relative to the total mass of the ink. In the ink having such a composition, the coloring materials used in combination may be capable of interacting synergistically on a recording medium, and thus may be capable of remarkably enhancing the light-fastness and gas-fastness of images without excessively degrading the intrinsic color developability of the coloring materials of the coloring material group. If the ratio of the compound expressed by general formula (I) is less than 15.0% by mass, it may be the case that the resulting image may not exhibit sufficient light-fastness or gas-fastness. In contrast, if the ratio is more than 40.0% by mass, it may be the case that the resulting image may not exhibit sufficient color developability.

Without being limited to any particular theory, the present inventors believe that the compound expressed by general formula (I) may be capable of imparting superior light-fastness and gas-fastness to images because of the following reasons. In the molecular structure of the compound expressed by general formula (I), electron-withdrawing sulfonate groups are bound to positions having a relatively high electron density, that is, to the p-positions of triazine ring-substituted aryloxide groups. This structure may be capable of preventing the coloring material in recorded matter from being degraded by exposure to environmental gas or light, and thus consequently may impart higher light-fastness and gas-fastness to images than with other anthrapyridone compounds. The general formula (I) for the coloring material is as follows:

mide, benzamide, methylamino, butylamino, diethylamino, triethanolamino, and phenylamino.

Although an anthrapyridone dye compound expressed by general formula (I) may be used according to aspects of the invention, it should be understood that not all other anthrapyridone dyes (such as those having a structure other than that of general formula (I)) are necessarily acceptable. For example, an ink containing compound (II) shown below that is an anthrapyridone dye, even when combined with the at least one coloring material selected from the above-described coloring material group, may not be capable of forming images having superior color stability.

Compound (II)

Without being limited to any one particular theory, the present inventors believe that the following may be reasons why an anthrapyridone dye, compound (II), cannot give high color stability to images.

The present inventors have found that a coloring material applied onto a recording medium does not stay at an initial position, but instead moves mainly in the thickness (depth) direction of the medium with the passage of time, and that this causes the degradation of the color stability. In order to enhance the color stability of images, the present inventors have found that it is advantageous that the coloring material has a structure that does not easily migrate in the recording medium; hence the coloring material provided may have a (I)

In general formula (I), each M independently represents hydrogen, an alkali metal, ammonium, or an organic ammonium. Examples of the alkali metal can include, but are not limited to, lithium, sodium, and potassium. Examples of the organic ammonium can include, but are not limited to, acetarelatively large molecular weight. However, the increase of the molecular weight of the coloring material may also reduce the proportion of the chromophore in the structure of the coloring material and thus reduce the color developing efficiency, consequently reducing the color developability of images. Thus, the color stability and the color developability of an image may in some cases be incompatible with each other. It is therefore difficult to achieve both high color developability and high color stability in an image, even if compound (II) is used as an anthrapyridone dye.

As described above, the color developability, light-fastness, gas-fastness, and color stability of an image may be enhanced only by using combinations of specific coloring materials in specific proportions.

The inkjet ink according to aspects of the present invention may further contain a compound expressed by general formula (II).

(II)

In general formula (II), each M independently represents hydrogen, an alkali metal, ammonium, or an organic ammonium. Examples of the alkali metal can include, but are not limited to, lithium, sodium, and potassium. Examples of the organic ammonium can include, but are not limited to, acetamide, benzamide, methylamino, butylamino, diethylamino, and phenylamino.

[Coloring Material Content]

As described above, the ratio of the compound expressed by general formula (I) to the total content of coloring materials in the inkjet ink may be in the range of 15.0% by mass or more to 40.0% by mass or less. If the ratio of the compound expressed by general formula (I) is less than 15.0% by mass, it can occur that the resulting image may not exhibit sufficient light-fastness or gas-fastness. In contrast, if the ratio is more than 40.0% by mass, it can occur that the resulting image may not exhibit sufficient color developability. The content of the compound expressed by general formula (I) and the total content of the coloring materials are values relative to the total mass of the ink.

The content of the compound expressed by general formula (I) in the ink can be in the range of 0.8% by mass or more to 2.0% by mass or less relative to the total mass of the ink. In certain embodiments, if the content of the compound expressed by general formula (I) is less than 0.8% by mass, it can occur that the resulting image may not exhibit sufficient light-fastness or gas-fastness, and a ratio of more than 2.0% by mass may result in an image having insufficient color developability.

In one version, the content of the coloring material selected from the coloring material group can be in the range of 0.06% by mass or more to 8.5% by mass or less relative to the total mass of the ink.

The total content of coloring materials can be in the range of 0.1% by mass or more to 10.0% by mass or less relative to the total mass of the ink. If the total content of coloring materials is less than 0.1% by mass, it may be the case that the resulting image may not exhibit sufficient light-fastness, gas-fastness, or density; if the total content of coloring materials is more than 10.0% by mass, it may be the case that the resulting image may not exhibit sufficient reliability, such as in clogging resistance.

[Confirmation of the Presence of Coloring Materials]

In one embodiment, by measuring the following three properties (1) to (3) by high performance liquid chromatography (HPLC), it can be determined whether or not an ink contains the coloring materials used according to aspects of the invention:

(1) Retention time;
(2) Maximum absorption wavelength in the peak of (1); and
(3) M/Z (posi, nega) of mass spectrum at the peak of (1).

HPLC can be performed under the following conditions. The ink liquid diluted to 1/1000 with pure water is used as a sample to be measured. The sample is subjected to HPLC analysis under the following conditions to measure the retention time of the peak and the maximum absorption wavelength in the peak.

Column: SunFire $C_{18}$, 2.1 mm×150 mm (manufactured by Waters Corporation)
Column temperature: 40° C.
Flow rate: 0.2 mL/min
PDA: 200 nm to 700 nm
Mobile phase and gradient conditions: see Table 1

TABLE 1

| Mobile phase and gradient conditions | | | | |
|---|---|---|---|---|
| | 0-5 min | 5-24 min | 24-31 min | 40-45 min |
| A: water | 85% | 85% → 45% | 45% → 0% | 0% |
| B: methanol | 10% | 10% → 50% | 50% → 95% | 95% |
| C: 0.2 mol/L ammonium acetate | 5% | 5% | 5% | 5% |

Mass spectroscopy can be performed under the following conditions. The mass spectrum of the resulting peak is measured under the following conditions and the most strongly detected M/Z is measured for each of posi and nega.

Ionization method
ESI
   Capillary voltage: 3.5 kV
   Desolvating gas: 300° C.
   Ion source temperature: 120° C.
Detector
   posi: 40 V 200 to 1500 amu/0.9 s
   nega: 40 V 200 to 1500 amu/0.9 s Compound (I) being a representative of the compound expressed by general formula (I) was subjected to the above-described measurements. Table 2 shows the resulting values of the retention time, maximum absorption wavelength, M/Z (posi) and M/Z (nega) for this compound. Inks having unknown compositions may be subjected to the same measurements under the same conditions. When an ink shows values such as those shown in Table 2, it can be determined that the ink contains a compound that the ink of the invention should contain.

TABLE 2

Analysis results

| | Retention time (min) | Maximum absorption wavelength (nm) | M/Z | |
|---|---|---|---|---|
| | | | posi | nega |
| Compound (1) | 18.0-19.0 | 500-520 | 990-993 | 987-990 |

(Other Coloring Materials)

The inkjet ink according to aspects of the invention may further contain other coloring materials in addition to the at least one coloring material selected from the coloring material group, the compound expressed by general formula (I), and optionally the compound expressed by general formula (II).

For example, in order to form full color images, inks having different colors from the inks described above may be used in combination, such as for example at least one of cyan ink, magenta ink, yellow ink, gray ink, and black ink. Pale or light inks, which may have the same colors of these inks, may also be used in combination. Known coloring materials or newly synthesized coloring materials may also be used as coloring materials for the different color inks or the pale or light inks.

(Aqueous Medium)

In one embodiment, the ink according to aspects of the invention can contain water or an aqueous medium comprising a mixture of water and a water-soluble organic solvent. For example, deionized water (i.e., ion exchanged water) can be suitably used for the ink according to aspects of the invention. The water content in the ink can be in the range of 10.0% by mass or more to 90.0% by mass or less relative to the total mass of the ink. The content of a water-soluble organic solvent in the ink can be in the range of 5.0% by mass or more to 90.0% by mass or less, such as in the range of 10.0% by mass or more to 50.0% by mass or less. If the water-soluble organic solvent content is less than 5.0% by mass, it may be the case that the ink cannot be easily ejected. If the content is more than 10.0% by mass, the viscosity of the ink may be increased and it may be the case that the ink cannot be delivered properly.

The water-soluble organic solvent that may be used in the ink is not particularly limited, as long as the organic solvent is soluble in water. Examples of the water-soluble organic solvent can include, but are not limited to: alkyl alcohols having a carbon number of 1 to 4, such as ethanol, isopropanol, n-butanol, isobutanol, sec-butanol, and tert-butanol; carboxylic amides, such as N,N-dimethylformamide and N,N-dimethylacetamide; ketones and ketone alcohols, such as acetone, methyl ethyl ketone, and 2-methyl-2-hydroxypentane-4-one; cyclic ethers, such as tetrahydrofuran and dioxane; polyhydric alcohols, such as glycerin, 1,3-butanediol, 1,5-pentanediol, 1,2-hexanediol, 1,6-hexanediol, 2-methyl-1,3-propanediol, 1,2,6-hexanetriol, and trimethylolpropane; glycols, such as ethylene glycol, diethylene glycol, triethylene glycol, tetraethylene glycol, 1,2- or 1,3-propylene glycol, 1,2- or 1,4-butylene glycol, polyethylene glycol, and acetylene glycol derivatives; polyhydric alcohol alkyl ethers, such as ethylene glycol monomethyl (or monoethyl) ether, diethylene glycol monomethyl (or monoethyl) ether, and triethylene glycol monoethyl (or monobutyl) ether; heterocycles, such as 2-pyrrolidone, N-methyl-2-pyrrolidone, 1,3-dimethyl-2-imidazolidinone, and N-methylmorpholine; sulfur-containing compounds, such as thiodiglycol and dimethyl sulfoxide; and nitrogen-containing compounds, such as urea and urea derivatives. These water-soluble organic solvents may be used singly or in combination.

(Other Additives)

The ink of the present invention may also optionally contain other additives, such as at least one of a surfactant, pH adjuster, chelating agent, corrosion inhibitor, preservative, antifungal agent, ultraviolet light adsorbent, viscosity modifier, antifoaming agent, and water-soluble polymer. For example, exemplary surfactants may include, but are not limited to, anionic surfactants, ampholytic surfactants, cationic surfactants, and nonionic surfactants.

<Inkjet Recording Method>

The ink according to aspects of the present invention may be suitable for use in an inkjet recording method in which an ink is ejected by an inkjet method to perform recording on a recording medium. In inkjet recording methods, for example, at least one of mechanical energy and thermal energy may be applied to an ink to eject the ink. In one version, the inkjet recording method can use thermal energy.

<Ink Cartridge>

An ink cartridge in which the ink according to aspects of the present invention can be used includes an ink holder containing an ink. The ink holder can contain the ink according to aspects of the invention. Embodiments of such an ink cartridge will now be described.

Figure 1:
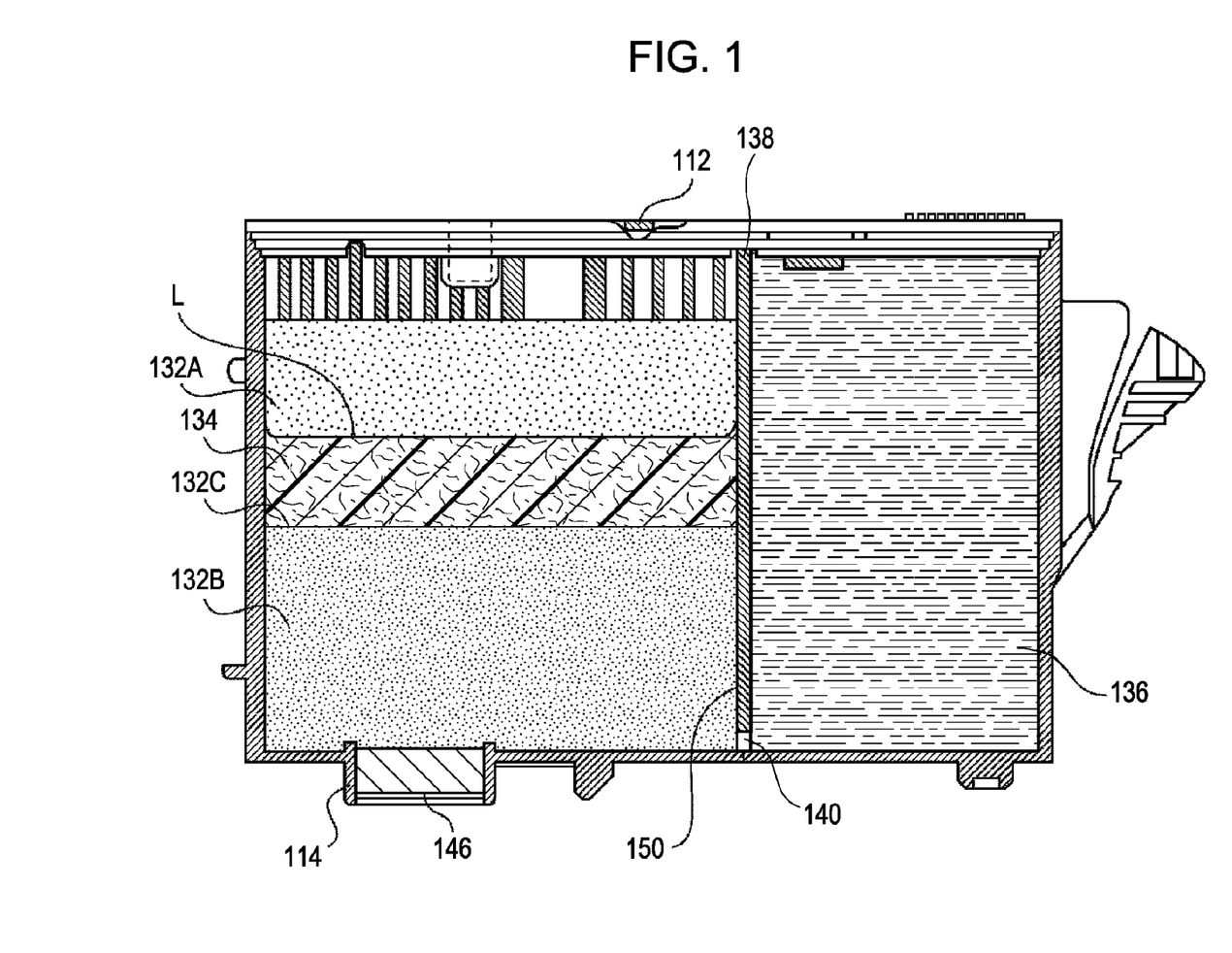
FIG. 1 is a schematic representation of an embodiment of an ink cartridge.

FIG. 1 is a schematic representation of an embodiment of an ink cartridge. The ink cartridge has a negative pressure generation member-holding chamber 134 containing a negative pressure generation member 132, and a substantially closed ink holder 136 containing an ink. The negative pressure generation member-holding chamber 134 and the ink holder 136 are separated by a partition wall 138. The cartridge communicates with the atmosphere through an air communication port 112 at the upper portion thereof, and with an ink supply port 114 at the lower portion thereof. The negative pressure generation member-holding chamber 134 and the ink holder 136 communicate with each other only through a communication hole 140 formed in the partition wall 138 close to the bottom of the cartridge, and an air introducing groove 150 for promoting the introduction of air into the ink holder 136 during ink supply operation. A plurality of ribs protruding inward are integrally formed to the upper wall of the ink cartridge defining part of the negative pressure generation member-holding chamber 134, and are in contact with the negative pressure generation member contained under compression in the negative pressure generation member-holding chamber 134. The ribs form an air buffer between the upper wall and upper surface of the negative pressure generation member. A pressure contact member 146 is disposed in an ink supply pipe having the ink supply port 114 so as to be in pressure contact with the negative pressure generation member 132. The pressure contact member 146 may have a higher capillary force and higher physical strength than the negative pressure generation member 132.

The negative pressure generation member-holding chamber 134 contains two capillary force-generating type negative pressure generation members: first negative pressure generation member 132B; and a second negative pressure generation member 132A. These two negative pressure generation members may be made of an olefin resin fiber, such as polyethylene. The negative pressure generation members are separated by a boundary layer 132C. The intersection of the boundary layer 132C and the partition wall 138 is located at the upper side of the upper edge of the air introducing groove 150 in an operation position of the ink cartridge in which the ink supply port 114 faces down. The level L of the ink held in the negative pressure generation member 132 is higher than the level of the boundary layer 132C.

The boundary layer 132C may be pressed against the first negative pressure generation member 132B and the second negative pressure generation member 132A. Consequently, the portion of the negative pressure generation member 132 around the boundary layer 132C is compressed more than the other portion and has a higher capillary force. When the first negative pressure generation member 132B has a capillary force P1, the second negative pressure generation member 132A has a capillary force P2, and the interface between these negative pressure generation members has a capillary force PS, such that the relationship P2<P1<PS holds.

Figure 2:
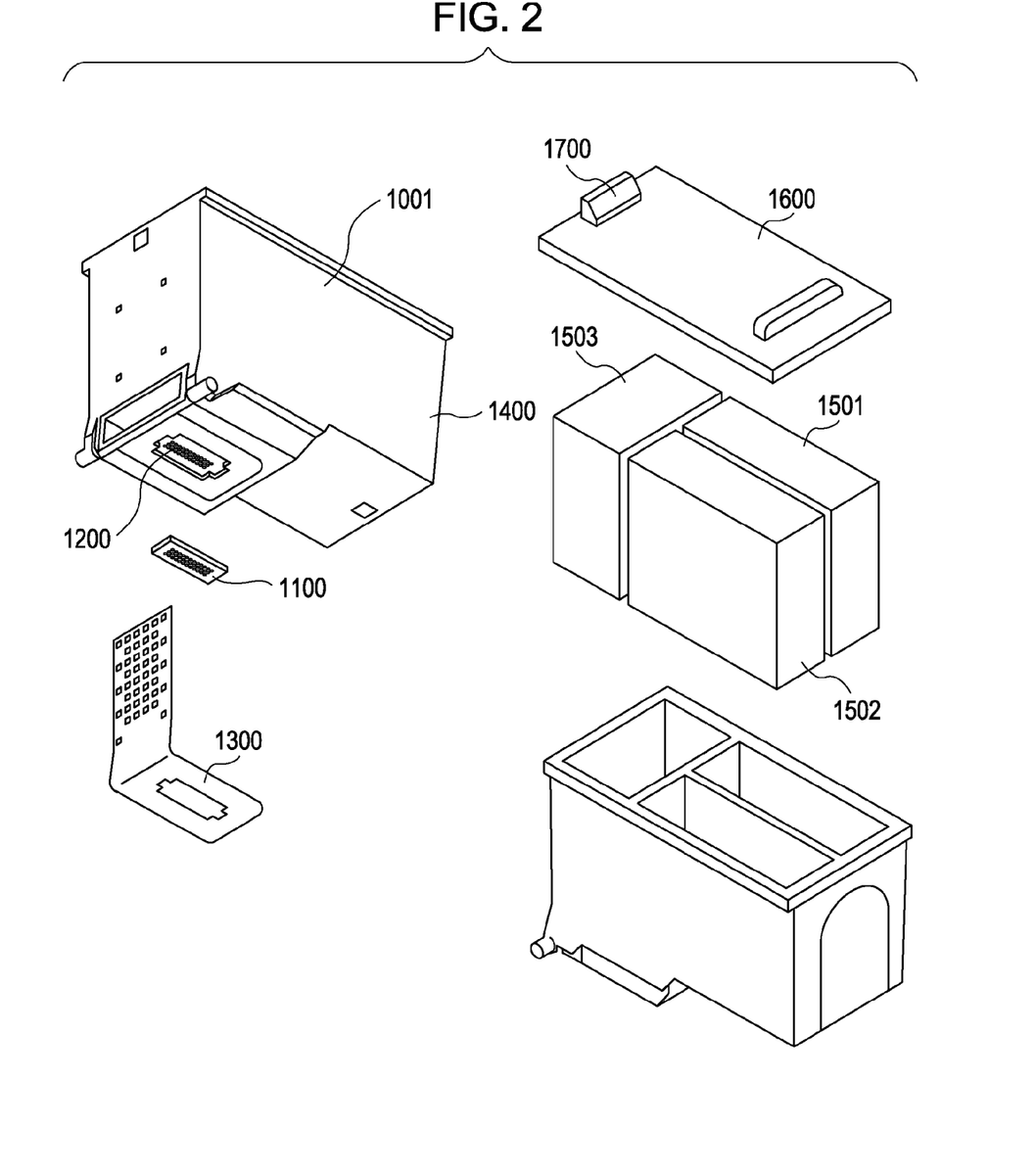
FIG. 2 is a schematic representation of another embodiment of an ink cartridge.

FIG. 2 is a schematic representation of another embodiment of an ink cartridge. This ink cartridge of this embodiment is integrated with a recording head. The ink cartridge 1001 is removably supported by, and secured to, a positioning member and an electrical contact of a carriage disposed in an inkjet recording apparatus. When the ink cartridge 1001 runs out of ink, it can be replaced.

The ink cartridge 1001 is configured to be capable of ejecting a plurality of inks of different colors (for example, cyan ink, magenta ink, and yellow ink). The ink cartridge includes a recording element substrate 1100, an electrical wiring tape 1300, an ink supplying/holding member 1400, ink absorption members 1501, 1502 and 1503, and a covering member 1600. Ink supply ports through which cyan, magenta, and yellow inks are respectively supplied are formed in parallel in the recording element substrate 1100. An electrical signal for ejecting ink is applied through the electrical wiring tape 1300. The ink supplying/holding member 1400 is made of a resin and contains the ink absorption members 1501, 1502, and 1503 producing negative pressure to hold ink.

The ink supplying/holding member 1400 may serve as an ink cartridge and to supply ink. More specifically, the ink supplying/holding member 1400 has spaces for the ink absorption members 1501 to 1503 that produce negative pressure to hold cyan, magenta, and yellow inks respectively, thus functioning as an ink cartridge. The ink supplying/holding member 1400 also has independent ink passages through which inks are delivered to the respective ink supply ports of the recording element substrate 1100, thus functioning to supply inks. The ink supply ports 1200 may be arranged downstream from the ink passages, and inks may be supplied therethrough to the recording element substrate 1100. The ink supply ports of the recording element substrate 1100 communicate with the respective ink supply ports 1200 of the ink supplying/holding member 1400, and thus the recording element substrate 1100 is secured to the ink supplying/holding member 1400. Part of the electrical wiring tape 1300 may be fixed to the plane surface around the ink supply port 1200. The covering member 1600 is welded to the upper edges of the ink supplying/holding member 1400 to cover the internal space in the ink supplying/holding member 1400. The covering member 1600 has an engaging portion 1700 securing the recording head to the inkjet recording apparatus.

<Method for Producing the Inkjet Ink>

The ink of the invention can be produced by any suitable method as long as an ink is produced that satisfies requirements according to aspects of the invention. More specifically, any suitable process may be applied as long as an ink is produced containing at least one coloring material selected from the coloring material group and another coloring material comprising a compound expressed by general formula (I) with a specific content of the total coloring materials, as described above.

In one version, the method can include the step of filling an ink containing at least one coloring material selected from the above-described coloring material group into the ink holder of an ink cartridge, the ink holder accommodating (i.e., holding) an ink containing a compound expressed by general formula (I). Thus, the ink containing a compound expressed by general formula (I), which may be capable of imparting a high fastness property to images, and the ink cartridge containing the ink, may be recycled to reduce the cost and waste, and thus to reduce the environmental load of the ink cartridge and ink. In addition, an ink cartridge that has already contained ink once before can provide the supplementary effect of allowing for relatively easy refilling of ink.

Furthermore, in the step of filling an ink, an ink containing at least one coloring material selected from the coloring material group can be filled so that the content of the compound expressed by general formula (I) is within a specific range relative to the total content of coloring materials. The ratio of the compound expressed by general formula (I) can be controlled by, for example, appropriately setting the content of the coloring material selected from the coloring material group or the amount of the ink filled according to the capacity of the ink cartridge.

EXAMPLES

The invention will further be described in detail with reference to the following Examples and Comparative Examples. However, it should be understood that the invention is not limited to the Examples and other embodiments may also be provided, unless departing from the scope of the invention. In the Examples, the part or percent (%) used in the "Synthesis of coloring materials" and "Preparation of inks" are on a mass basis.

<Synthesis of Coloring Materials>

Compound (I) was synthesized according to the following procedure. Compound (I) is a compound expressed by general formula (I), in which M is sodium.

(A) To 360 parts of xylene were added 94.8 parts of the compound expressed by formula (1), 3.0 parts of sodium carbonate, and 144.0 parts of ethyl benzoylacetate one by one with stirring. The mixture was subjected to reaction at a liquid temperature of 140 to 150° C. for 8 hours. During the reaction, ethanol and water produced by the reaction was subjected to azeotropic distillation with xylene. Thus, the reaction was completed. To the reaction mixture cooled to 30° C., 240 parts of methanol was added and stirred for 30 minutes. The resulting precipitate was filtered to yield a solid. After being washed with 360 parts of methanol, the solid was dried to yield 124.8 parts of compound expressed by formula (2) in a form of light yellow needle crystals.

(1)

(2)

(4)

(B) To 300.0 parts of N,N-dimethylformamide were added 88.8 parts of the compound expressed by formula (2) produced in the above step, 75.0 parts of m-aminoacetanilide, 24.0 parts of copper acetate monohydrate, and 12.8 parts of sodium carbonate one by one with stirring. The mixture was heated to a temperature of 120 to 130° C. and subjected to reaction for 3 hours. To the reaction mixture cooled to about 50° C., 120 parts of methanol was added and stirred for 30 minutes. The resulting precipitate was filtered to yield a solid. The solid was washed with 500 parts of methanol thereafter with 80° C. water, then dried to yield 79.2 parts of compound expressed by formula (3) in a form of bluish red crystals.

(D) To 60 parts of water was added 67.7 parts of the wet cake of the compound expressed by formula (4). Then, 24 parts of 25% sodium hydroxide aqueous solution was added to the mixture and stirred. The mixture was dissolved while the pH was adjusted to 3 to 4 by further adding 25% sodium hydroxide aqueous solution. To 60 parts of ice water was added 0.4 part of anionic surfactant LIPAL OH (product name, produced by Lion Corporation), and 8.9 parts of cyanuric chloride was further added. The mixture was stirred for 30 minutes to yield a suspension. The suspension was added to the above solution containing the compound expressed by formula (4). While the pH of the liquid was adjusted to 2.7 to 3.0 with 10% sodium hydroxide solution, a reaction was performed at a temperature of 25 to 30° C. for 4 hours to yield a reaction mixture containing the compound expressed by formula (5).

(3)

(5)

(C) While the reaction system was cooled with water, 170 parts of 28% fuming sulfuric acid was added to 130 parts of 98% sulfuric acid with stirring. Thus, 300 parts of 12% fuming sulfuric acid was prepared. While the reaction system was cooled with water, 51.3 parts of the compound expressed by formula (3) was added to the above-prepared sulfuric acid solution at a temperature of 50° C. or less. Then, the reaction mixture was heated to a temperature of 85 to 90° C. and subjected to reaction for 4 hours. The reaction mixture was added to 600 parts of ice water while the reaction mixture was cooled with ice to keep the temperature at 40° C. and prevent the reaction mixture from being headed by heat of reaction. Furthermore, water was added to the reaction mixture to 1000 parts, and insoluble residue was filtered out. Warm water was added to the resulting mother liquor to 1500 parts, and 300 parts of sodium chloride was added to the liquid and stirred for 2 hours to precipitate crystals while the liquid temperature was kept at 60 to 65° C. The crystals were filtered. The resulting crystals were washed with 300 parts of 20% sodium chloride solution and then squeezed to yield 100.3 parts of red crystals in a wet cake form. This wet cake included 59.2 parts of the compound expressed by formula (4).

(E) To the reaction mixture containing the compound expressed by formula (5), 9.5 parts of sodium p-phenol sulfonate dehydrate was added. Then, while the pH of the liquid was adjusted to 6.5±0.3 with 25% sodium hydroxide solution, the liquid was heated to a temperature of 50 to 55° C. and subjected to reaction at that temperature for 1 hour. Thus, a reaction mixture containing the compound expressed by formula (6) was obtained.

(6)

(F) To the reaction mixture containing the compound expressed by formula (6), 1.2 parts of ethylenediamine was added. Then, while the pH of the liquid was adjusted to 7.8 to 8.2 with 25% sodium hydroxide solution, the liquid was heated to a temperature of 78 to 82° C. and subjected to reaction at that temperature for 1 hour. Then, water was added to the reaction mixture to about 350 parts, and insoluble residue was filtered out. Water was added to the resulting mother liquor to 400 parts, and concentrated hydrochloric acid was added to the liquid to adjust the pH of the liquid to 3 while the liquid temperature was kept at 55±2° C. Then, 40 parts of sodium chloride was added to the liquid over a period of 15 minutes and the mixture was stirred for 30 minutes. In addition, concentrated hydrochloric acid was added to adjust the pH of the liquid to 2. The resulting acid solution was stirred for 1 hour to precipitate crystals, followed by filtration. The resulting crystals were washed with 100 parts of 20% sodium chloride solution to yield compound (I).

Compound (I)

As Compound (II), the sodium salt of a dye synthesized in EXAMPLE 4 disclosed in International Publication No. WO2004/104108 was used.

Compound (II)

As Compound (III), the sodium salt of a dye synthesized in EXAMPLE 3 disclosed in Japanese Patent Laid-Open No. 2003-192930 was used.

Compound (III)

As Compound (IV), the sodium salt of a dye synthesized in EXAMPLE 1 disclosed in International Publication No. WO2006/075706 was used.

Compound (IV)

<Preparation of Inks>

Materials shown in Table 3 to 6 were sufficiently mixed, and the resulting mixture was pressure-filtered through a membrane filter having a pore size of 0.2 μm (manufactured by Advantech) to yield an ink.

TABLE 3

Ink compositions of Examples (content, %)

| | \multicolumn{12}{c|}{Example} |
|---|---|---|---|---|---|---|---|---|---|---|---|---|
| | 1 | 2 | 3 | 4 | 5 | 6 | 7 | 8 | 9 | 10 | 11 | 12 |
| C.I. Direct Violet 107 | 4.25 | | | | | | 4.20 | | | | | |
| C.I. Acid Red 14 | | 4.25 | | | | | | 4.20 | | | | |
| C.I. Acid Red 52 | | | 4.25 | | | | | | 4.20 | | | |
| C.I. Acid Red 87 | | | | 4.25 | | | | | | 4.20 | | |
| C.I. Acid Red 289 | | | | | 4.25 | | | | | | 4.20 | |
| C.I. Reactive Red 180 | | | | | | 4.25 | | | | | | 4.20 |
| Compound (I) | 0.75 | 0.75 | 0.75 | 0.75 | 0.75 | 0.75 | 0.80 | 0.80 | 0.80 | 0.80 | 0.80 | 0.80 |
| Compound (II) | | | | | | | | | | | | |
| Compound (III) | | | | | | | | | | | | |
| Compound (IV) | | | | | | | | | | | | |
| Glycerin | 20.00 | 20.00 | 20.00 | 20.00 | 20.00 | 20.00 | 20.00 | 20.00 | 20.00 | 20.00 | 20.00 | 20.00 |
| Acetylenol E100 (*1) | 1.00 | 1.00 | 1.00 | 1.00 | 1.00 | 1.00 | 1.00 | 1.00 | 1.00 | 1.00 | 1.00 | 1.00 |
| Ion exchanged water | 74.00 | 74.00 | 74.00 | 74.00 | 74.00 | 74.00 | 74.00 | 74.00 | 74.00 | 74.00 | 74.00 | 74.00 |
| Total content of coloring materials | 5.00 | 5.00 | 5.00 | 5.00 | 5.00 | 5.00 | 5.00 | 5.00 | 5.00 | 5.00 | 5.00 | 5.00 |
| Compound (I) content | 0.75 | 0.75 | 0.75 | 0.75 | 0.75 | 0.75 | 0.80 | 0.80 | 0.80 | 0.80 | 0.80 | 0.80 |
| Ratio of Compound (I) (*2) | 15.0 | 15.0 | 15.0 | 15.0 | 15.0 | 15.0 | 16.0 | 16.0 | 16.0 | 16.0 | 16.0 | 16.0 |

(*1): Ethylene oxide adduct of acetylene glycol (surfactant, produced by Kawaken Fine Chemicals)
(*2): Ratio of compound expressed by general formula (I) to the total content of coloring materials = Compound (I)/all coloring materials × 100

TABLE 4

Ink compositions of Examples (content, %)

| | \multicolumn{12}{c|}{Example} |
|---|---|---|---|---|---|---|---|---|---|---|---|---|
| | 13 | 14 | 15 | 16 | 17 | 18 | 19 | 20 | 21 | 22 | 23 | 24 |
| C.I. Direct Violet 107 | 3.50 | | | | | | 3.00 | | | | | |
| C.I. Acid Red 14 | | 3.50 | | | | | | 3.00 | | | | |
| C.I. Acid Red 52 | | | 3.50 | | | | | | 3.00 | | | |
| C.I. Acid Red 87 | | | | 3.50 | | | | | | 3.00 | | |

TABLE 4-continued

Ink compositions of Examples (content, %)

| | Example | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| C.I. Acid Red 289 | | | | | 3.50 | | | | | | 3.00 | |
| C.I. Reactive Red 180 | | | | | | 3.50 | | | | | | 3.00 |
| Compound (I) | 1.50 | 1.50 | 1.50 | 1.50 | 1.50 | 1.50 | 2.00 | 2.00 | 2.00 | 2.00 | 2.00 | 2.00 |
| Compound (II) | | | | | | | | | | | | |
| Compound (III) | | | | | | | | | | | | |
| Compound (IV) | | | | | | | | | | | | |
| Glycerin | 20.00 | 20.00 | 20.00 | 20.00 | 20.00 | 20.00 | 20.00 | 20.00 | 20.00 | 20.00 | 20.00 | 20.00 |
| Acetylenol E100 (*1) | 1.00 | 1.00 | 1.00 | 1.00 | 1.00 | 1.00 | 1.00 | 1.00 | 1.00 | 1.00 | 1.00 | 1.00 |
| Ion exchanged water | 74.00 | 74.00 | 74.00 | 74.00 | 74.00 | 74.00 | 74.00 | 74.00 | 74.00 | 74.00 | 74.00 | 74.00 |
| Total content of coloring materials | 5.00 | 5.00 | 5.00 | 5.00 | 5.00 | 5.00 | 5.00 | 5.00 | 5.00 | 5.00 | 5.00 | 5.00 |
| Compound (I) content | 1.50 | 1.50 | 1.50 | 1.50 | 1.50 | 1.50 | 2.00 | 2.00 | 2.00 | 2.00 | 2.00 | 2.00 |
| Ratio of Compound (I) (*2) | 30.0 | 30.0 | 30.0 | 30.0 | 30.0 | 30.0 | 40.0 | 40.0 | 40.0 | 40.0 | 40.0 | 40.0 |

(*1): Ethylene oxide adduct of acetylene glycol (surfactant, produced by Kawaken Fine Chemicals)
(*2): Ratio of compound expressed by general formula (I) to the total content of coloring materials = Compound (I)/all coloring materials × 100

TABLE 5

Ink compositions of Comparative Examples (content, %)

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| C.I. Direct Violet 107 | 5.00 | | | | | | 4.30 | | | | | |
| C.I. Acid Red 14 | | 5.00 | | | | | | 4.30 | | | | |
| C.I. Acid Red 52 | | | 5.00 | | | | | | 4.30 | | | |
| C.I. Acid Red 87 | | | | 5.00 | | | | | | 4.30 | | |
| C.I. Acid Red 289 | | | | | 5.00 | | | | | | 4.30 | |
| C.I. Reactive Red 180 | | | | | | 5.00 | | | | | | 4.30 |
| Compound (I) | | | | | | | 0.70 | 0.70 | 0.70 | 0.70 | 0.70 | 0.70 |
| Compound (II) | | | | | | | | | | | | |
| Compound (III) | | | | | | | | | | | | |
| Compound (IV) | | | | | | | | | | | | |
| Glycerin | 20.00 | 20.00 | 20.00 | 20.00 | 20.00 | 20.00 | 20.00 | 20.00 | 20.00 | 20.00 | 20.00 | 20.00 |
| Acetylenol E100 (*1) | 1.00 | 1.00 | 1.00 | 1.00 | 1.00 | 1.00 | 1.00 | 1.00 | 1.00 | 1.00 | 1.00 | 1.00 |
| Ion exchanged water | 74.00 | 74.00 | 74.00 | 74.00 | 74.00 | 74.00 | 74.00 | 74.00 | 74.00 | 74.00 | 74.00 | 74.00 |
| Total content of coloring materials | 5.00 | 5.00 | 5.00 | 5.00 | 5.00 | 5.00 | 5.00 | 5.00 | 5.00 | 5.00 | 5.00 | 5.00 |
| Compound (I) content | 0.00 | 0.00 | 0.00 | 0.00 | 0.00 | 0.00 | 0.70 | 0.70 | 0.70 | 0.70 | 0.70 | 0.70 |
| Ratio of Compound (I) (*2) | 0.0 | 0.0 | 0.0 | 0.0 | 0.0 | 0.0 | 14.0 | 14.0 | 14.0 | 14.0 | 14.0 | 14.0 |

(*1): Ethylene oxide adduct of acetylene glycol (surfactant, produced by Kawaken Fine Chemicals)
(*2): Ratio of compound expressed by general formula (I) to the total content of coloring materials = Compound (I)/all coloring materials × 100

TABLE 6

Ink compositions of Comparative Examples (content, %)

| | Comparative Example | | | | | | | | |
|---|---|---|---|---|---|---|---|---|---|
| | 13 | 14 | 15 | 16 | 17 | 18 | 19 | 20 | 21 |
| C.I. Direct Violet 107 | 2.95 | | | | | | | | |
| C.I. Acid Red 14 | | 2.95 | | | | | | | |
| C.I. Acid Red 52 | | | 2.95 | | | | | | |
| C.I. Acid Red 87 | | | | 2.95 | | | | | |
| C.I. Acid Red 289 | | | | | 2.95 | | 4.30 | 4.30 | 4.30 |
| C.I. Reactive Red 180 | | | | | | 2.95 | | | |
| Compound (I) | 2.05 | 2.05 | 2.05 | 2.05 | 2.05 | 2.05 | | | |
| Compound (II) | | | | | | | 0.70 | | |
| Compound (III) | | | | | | | | 0.70 | |
| Compound (IV) | | | | | | | | | 0.70 |
| Glycerin | 20.00 | 20.00 | 20.00 | 20.00 | 20.00 | 20.00 | 20.00 | 20.00 | 20.00 |

TABLE 6-continued

Ink compositions of Comparative Examples (content, %)

| | Comparative Example | | | | | | | | |
|---|---|---|---|---|---|---|---|---|---|
| | 13 | 14 | 15 | 16 | 17 | 18 | 19 | 20 | 21 |
| Acetylenol E100 (*1) | 1.00 | 1.00 | 1.00 | 1.00 | 1.00 | 1.00 | 1.00 | 1.00 | 1.00 |
| Ion exchanged water | 74.00 | 74.00 | 74.00 | 74.00 | 74.00 | 74.00 | 74.00 | 74.00 | 74.00 |
| Total content of coloring materials | 5.00 | 5.00 | 5.00 | 5.00 | 5.00 | 5.00 | 5.00 | 5.00 | 5.00 |
| Compound (I) content | 2.05 | 2.05 | 2.05 | 2.05 | 2.05 | 2.05 | 0.00 | 0.00 | 0.00 |
| Ratio of Compound (I) (*2) | 41.0 | 41.0 | 41.0 | 41.0 | 41.0 | 41.0 | 0.0 | 0.0 | 0.0 |

(*1): Ethylene oxide adduct of acetylene glycol (surfactant, produced by Kawaken Fine Chemicals)
(*2): Ratio of compound expressed by general formula (I) to the total content of coloring materials = Compound (I)/all coloring materials × 100

<Preparation of Recorded Matter>

Ink cartridges filled with the respective inks prepared above were mounted separately in an inkjet recording apparatus (product name: Pixus iP8600, manufactured by Canon), and recorded matter was prepared. The recording was performed under the conditions: temperature 23° C., relative humidity 55%, recording density 2,400 dpi×1,200 dpi, and ejection amount 2.5 pL. An image (recording duty 50%) was formed on a recording medium (product name: Professional Photo Paper PR101, manufactured by Canon), and the resulting recorded matter was air-dried at a temperature of 23° C. and a relative humidity of 55% for 24 hours.

<Evaluation>

(Color Developability)

For the evaluation of color developability, the optical density of the magenta component in the image of the recorded matter was measured at a field of view of 2° with a spectrophotometer (Spectorolino, manufactured by Gretag Macbeth) using a D50 light source. The color developability was evaluated according to the following criteria. The results are shown in Tables 7 and 8. In this evaluation, A represents a high level, and B and C represent unacceptable levels.
A: Optical density≧1.7
B: 1.5≦Optical density<1.7
C: Optical density<1.5

<Light-Fastness>

The optical density of the magenta component in the image of the recorded matter was measured at a field of view of 2° with a spectrophotometer (Spectorolino, manufactured by Gretag Macbeth) using a D50 light source. Then, the recorded matter was placed in Super Xenon Weather Meter (model: SX-75, manufactured by Suga Test Instrument), and exposed to light having an irradiation intensity of 100 klx under conditions of a temperature of 24° C. and a relative humidity of 60% for 48 hours. After the exposure, the optical density of the magenta component in the image of the recorded matter was measured under the same conditions as above. The residual optical density rate was calculated from the optical densities before and after the test (exposure) according to the following equation for the evaluation of light-fastness. The light-fastness was evaluated according to the following criteria. The results are shown in Tables 7 and 8. In this evaluation, A represents a high level, and B and C represent unacceptable levels.

$$\text{Residual optical density rate [\%]} = \frac{\text{Optical density after test}}{\text{Optical density before test}} \times 100\,[\%]$$

A: residual optical density rate≧80%
B: 70%≦residual optical density rate<80%
C: residual optical density rate<70%

(Gas-Fastness)

The optical density of the magenta component in the image of the recorded matter was measured at a field of view of 2° with a spectrophotometer (Spectorolino, manufactured by Gretag Macbeth) using a D50 light source. Then, the recorded matter was placed in Ozone Weather Meter (model: OMS-H, manufactured by Suga Test Instrument), and exposed to ozone gas of 2.5 ppm in concentration under conditions of a temperature of 40° C. and a relative humidity of 60% for 32 hours. After the exposure, the optical density of the magenta component in the image of the recorded matter was measured under the same conditions as above. The residual optical density rate was calculated from the optical densities before and after the test (exposure) according to the above equation for the evaluation of gas-fastness. The gas-fastness was evaluated according to the following criteria. The results are shown in Tables 7 and 8. In this evaluation, inks marked AA and A exhibited sufficient property levels: AA represents a particularly high level; A represents a high level; and B and C represent unacceptable levels.
AA: residual optical density rate≧85%
A: 80%≦residual optical density rate<85%
B: 70%≦residual optical density rate<80%
C: residual optical density rate<70%

(Color Stability)

Ink cartridges filled with the respective inks prepared above were mounted separately in an inkjet recording apparatus (product name: Pixus iP8600, manufactured by Canon), and recorded matter was prepared. The recording was performed under the conditions: temperature 23° C., relative humidity 55%, recording density 2,400 dpi×1,200 dpi, and ejection amount 2.5 pL. An image (recording duty 60%) was formed on a recording medium (product name: Professional Photo Paper PR101, manufactured by Canon). For the evaluation of color stability, the difference in hue was visually observed between the recorded matter air-dried for 24 hours in an atmosphere of a temperature of 25° C. and a relative humidity of 20% and the recorded matter allowed to stand for 5 minutes after being formed in the same manner. The color stability was evaluated according to the following criteria. The results are shown in Tables 7 and 8.
A: No difference in hue was observed and high level property was exhibited.

B: Small difference in hue was observed, but permissible property level was exhibited.

C: Distinct difference in hue was observed and impermissible level property was exhibited.

TABLE 7

Evaluation results

|  | | Color developability | Light-fastness | Gas-fastness | Color stability |
|---|---|---|---|---|---|
| Example | 1 | A | A | A | A |
|  | 2 | A | A | A | A |
|  | 3 | A | A | A | A |
|  | 4 | A | A | A | A |
|  | 5 | A | A | A | A |
|  | 6 | A | A | A | A |
|  | 7 | A | A | AA | A |
|  | 8 | A | A | AA | A |
|  | 9 | A | A | AA | A |
|  | 10 | A | A | AA | A |
|  | 11 | A | A | AA | A |
|  | 12 | A | A | AA | A |
|  | 13 | A | A | AA | A |
|  | 14 | A | A | AA | A |
|  | 15 | A | A | AA | A |
|  | 16 | A | A | AA | A |
|  | 17 | A | A | AA | A |
|  | 18 | A | A | AA | A |
|  | 19 | A | A | AA | A |
|  | 20 | A | A | AA | A |
|  | 21 | A | A | AA | A |
|  | 22 | A | A | AA | A |
|  | 23 | A | A | AA | A |
|  | 24 | A | A | AA | A |

TABLE 8

Evaluation results

|  | | Color developability | Light-fastness | Gas-fastness | Color stability |
|---|---|---|---|---|---|
| Example | 1 | A | C | C | A |
|  | 2 | A | C | C | A |
|  | 3 | A | C | C | A |
|  | 4 | A | C | C | A |
|  | 5 | A | C | C | A |
|  | 6 | A | C | C | A |
|  | 7 | A | B | B | A |
|  | 8 | A | B | B | A |
|  | 9 | A | B | B | A |
|  | 10 | A | B | B | A |
|  | 11 | A | B | B | A |
|  | 12 | A | B | B | A |
|  | 13 | B | A | A | A |
|  | 14 | B | A | A | A |
|  | 15 | B | A | A | A |
|  | 16 | B | A | A | A |
|  | 17 | B | A | A | A |
|  | 18 | B | A | A | A |
|  | 19 | A | C | C | C |
|  | 20 | A | C | C | A |
|  | 21 | A | C | B | A |

<Preparation of Ink>

Materials shown in Table 9 were sufficiently mixed, and the resulting mixture was pressure-filtered through a membrane filter having a pore size of 0.2 μm (manufactured by Advantech) to yield ink A.

TABLE 9

| Ink Composition (%) | |
|---|---|
|  | Ink A |
| Compound (I) | 6.00 |
| Glycerin | 20.00 |
| Acetylenol E100 (*1) | 1.00 |
| Ion exchanged water | 73.00 |

(*1): Surfactant, produced by Kawaken Fine Chemicals

Ten grams of Ink A prepared according to the composition shown in Table 9 was filled into six ink cartridges each having the structure shown in the embodiment of FIG. 1. Then, 8.0 g of Ink A was ejected from each ink cartridge. Eight grams of inks of Comparative Examples 1 to 6 were filled into the above respective ink cartridges. Thus, inks of Examples 25 to 30 were prepared. The inks of Examples 25 to 30 were extracted from the respective ink cartridges and were subjected to composition analysis. These inks had the compositions shown in Table 10.

TABLE 10

| Ink Composition | | | | | | |
|---|---|---|---|---|---|---|
| | | | | | | (content, %) |
| | Example | | | | | |
| | 25 | 26 | 27 | 28 | 29 | 30 |
| C.I. Direct Violet 107 | 3.50 | | | | | |
| C.I. Acid Red 14 | | 3.50 | | | | |
| C.I. Acid Red 52 | | | 3.50 | | | |
| C.I. Acid Red 87 | | | | 3.50 | | |
| C.I. Acid Red 289 | | | | | 3.50 | |
| C.I. Reactive Red 180 | | | | | | 3.50 |
| Compound (I) | 1.60 | 1.60 | 1.60 | 1.60 | 1.60 | 1.60 |
| Glycerin | 20.00 | 20.00 | 20.00 | 20.00 | 20.00 | 20.00 |
| Acetylenol E100 (*1) | 1.00 | 1.00 | 1.00 | 1.00 | 1.00 | 1.00 |
| Ion exchanged water | 73.90 | 73.90 | 73.90 | 73.90 | 73.90 | 73.90 |
| Total content of coloring materials | 5.10 | 5.10 | 5.10 | 5.10 | 5.10 | 5.10 |
| Compound (I) content | 1.60 | 1.60 | 1.60 | 1.60 | 1.60 | 1.60 |
| Ratio of Compound (I) (*2) | 31.4 | 31.4 | 31.4 | 31.4 | 31.4 | 31.4 |

(*1): Ethylene oxide adduct of acetylene glycol (surfactant, produced by Kawaken Fine Chemicals)
(*2): Ratio of compound expressed by general formula (I) to the total content of coloring materials = Compound (I)/all coloring materials × 100

<Evaluation of Ink Producing Method>

Ink cartridges filled with the respective inks of Examples 25 to 30 were mounted separately in an inkjet recording apparatus (product name: Pixus iP8600, manufactured by Canon), and recorded matter was prepared. The recording was performed under the conditions: temperature 23° C., relative humidity 55%, recording density 2,400 dpi×1,200 dpi, and ejection amount 2.5 pL. An image (recording duty 50%) was formed on a recording medium (product name: Professional Photo Paper PR101, manufactured by Canon), and the resulting recorded matter was air-dried at a temperature of 23° C. and a relative humidity of 55% for 24 hours. The color developability, light-fastness, and gas-fastness of thus prepared recorded matter were evaluated according to the same criteria as above. Recorded matters were prepared in the same manner as above and were allowed to stand for 5 minutes or 24 hours. These samples were evaluated for color stability according to the same criteria as above. The results are shown in Table 11.

TABLE 11

| | | Evaluation results | | | |
|---|---|---|---|---|---|
| | | Color developability | Light-fastness | Gas-fastness | Color stability |
| Example | 25 | A | A | AA | A |
| | 26 | A | A | AA | A |
| | 27 | A | A | AA | A |
| | 28 | A | A | AA | A |
| | 29 | A | A | AA | A |
| | 30 | A | A | AA | A |

Accordingly, the examples in accordance with aspects of the present invention may be capable of providing an inkjet ink that can form images having good and even superior color developability, light-fastness, gas-fastness, and color stability. The examples in accordance with aspects of the present invention may also be capable of providing a method for producing an inkjet ink that can form images that are good and even superior in color developability, light-fastness, gas-fastness, and color stability. Furthermore, the examples in accordance with aspects of the present invention may be capable of providing an inkjet recording method and an ink cartridge using the inkjet ink.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-125877 filed May 13, 2008, which is hereby incorporated by reference herein in its entirety.

What is claimed is:

1. An inkjet ink comprising:
   at least one coloring material selected from the group consisting of C. I. Direct Violet 107, C. I. Acid Red 14, C. I. Acid Red 52, C. I. Acid Red 87, C. I. Acid Red 289 and C. I. Reactive Red 180; and
   a coloring material comprising a compound expressed by general formula (I):

(I)

-continued wherein each M independently represents hydrogen, an alkali metal, ammonium, or an organic ammonium, and
wherein a ratio of a content in the inkjet ink of the compound expressed by general formula (I) to a total content of coloring materials in the inkjet ink is in a range of 15.0% by mass or more to 40.0% by mass or less.

2. The inkjet ink according to claim 1, wherein the content of the compound expressed by general formula (I) in the inkjet ink is in a range of 0.8% by mass or more to 2.0% by mass or less relative to a total mass of the ink.

3. The inkjet ink according to claim 1, further comprising a compound expressed by general formula (II):

(II)

wherein each M independently represents hydrogen, an alkali metal, ammonium, or an organic ammonium.

4. A method for producing an inkjet ink comprising:
   filling an inkjet ink containing at least one coloring material selected from the group consisting of C. I. Direct Violet 107, C. I. Acid Red 14, C. I. Acid Red 52, C. I. Acid Red 87, C. I. Acid Red 289 and C. I. Reactive Red 180 into an ink holder of an ink cartridge, the ink holder accommodating an inkjet ink containing a coloring material comprising a compound expressed by general formula (I):

wherein each M independently represents hydrogen, an alkali metal, ammonium, or an organic ammonium, and wherein the inkjet ink is filled into the ink holder of the ink cartridge such that a ratio of the compound expressed by general formula (I) to a total content of coloring materials in the inkjet ink is in a range of 15.0% by mass or more to 40.0% by mass or less.

5. The method for producing an inkjet ink according to claim 4, wherein a content of the compound expressed by general formula (I) in the inkjet ink is in a range of 0.8% to 2.0% by mass relative to a total mass of the ink.

6. An inkjet ink produced by the method as set forth in claim 4.

7. An ink cartridge comprising an ink holder containing the inkjet ink as set forth in claim 1.

8. An ink cartridge comprising an ink holder containing the inkjet ink as set forth in claim 6.

9. An inkjet recording method, the method comprising ejecting the inkjet ink as set forth in claim 1 to perform recording on a recording medium.

10. An inkjet recording method, the method comprising ejecting the inkjet ink as set forth in claim 6 to perform recording on a recording medium.

* * * * *